US 6,233,645 B1

(12) United States Patent
Chrysos et al.

(10) Patent No.: US 6,233,645 B1
(45) Date of Patent: May 15, 2001

(54) DYNAMICALLY DISABLING SPECULATIVE PREFETCH WHEN HIGH PRIORITY DEMAND FETCH OPPORTUNITY USE IS HIGH

(75) Inventors: George Z. Chrysos, Milford; Wilson P. Snyder, II, Hudson, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/184,623

(22) Filed: Nov. 2, 1998

(51) Int. Cl.$^7$ ................................................. G06F 13/18
(52) U.S. Cl. ..................... 710/244; 710/116; 711/213; 712/207
(58) Field of Search ..................... 710/244, 116; 712/207; 711/213

(56) References Cited

U.S. PATENT DOCUMENTS

| 5,421,020 | 5/1995 | Levitan | 712/237 |
|---|---|---|---|
| 5,421,022 | 5/1995 | McKeen et al. | 712/23 |
| 5,454,117 | 9/1995 | Puziol et al. | 712/23 |
| 5,506,989 | * 4/1996 | Boldt et al. | 710/244 |
| 5,561,776 | 10/1996 | Popescu et al. | 712/239 |
| 5,613,083 | 3/1997 | Glew et al. | 711/207 |
| 5,625,837 | 4/1997 | Popescu et al. | 712/23 |
| 5,627,983 | 5/1997 | Popescu et al. | 712/217 |
| 5,754,800 | * 5/1998 | Lentz et al. | 710/116 |
| 6,035,392 | * 3/2000 | Liptay et al. | 712/236 |
| 6,073,132 | * 6/2000 | Gehman | 707/9 |
| 6,073,159 | * 6/2000 | Emer et al. | 709/103 |

FOREIGN PATENT DOCUMENTS 0 651 324 A1  5/1995  (EP) .
0 738 962 A2  10/1996  (EP) .
0 763 793 A2  3/1997  (EP) .

OTHER PUBLICATIONS

Lee, D. and Baer, J–L., "Instruction Cache Fetch Policies for Speculative Execution," Proc. of 22nd Annual International Symposium on Computer Architecture, pp. 357–367 (1995).
Gonzales, J., and Gonzalez, A., "Speculative Execution via Address Prediction and Data Prefetching," Proc. of International Conference on Supercomputing 1997, ACM, NY, pp. 196–203 (1997).

(List continued on next page.)

Primary Examiner—Kenneth S. Kim
(74) Attorney, Agent, or Firm—Hamilton, Brook, Smith & Reynolds, P.C.

(57) ABSTRACT

A method of limiting, in a digital processor, low-priority utilization of a resource in favor of high-priority utilization of the resource comprises determining a value predictive of high-priority utilization of the resource. Low-priority utilization of the resource is inhibited if the determined predictive value is greater than a threshold. On the other hand, if the predictive value is less than or equal to the threshold, then low-priority utilization of the resource is allowed. In a preferred embodiment, the predictive value is derived by counting the number of actual high-priority utilizations of the resource out of the last N opportunities in which the resource could have been utilized for a high-priority need. Preferably, recent utilizations are given more weight than others. In a preferred embodiment, the resource comprises one of main memory, instruction cache memory, or data cache memory. High-priority utilization comprises high-priority access to memory and low-priority utilization comprises memory prefetching. Low priority utilizations are throttled when the threshold is exceeded. Counting and comparing are done with a shift register, counting logic, and a comparator; or with a counter and a comparator; or with two shift registers in which case no comparator is needed.

27 Claims, 3 Drawing Sheets

OTHER PUBLICATIONS

Appelbe, et al., "Hoisting Branch Conditions—Improving Super–Scalar Processor Performance," Proc. of Languages and Compilers for Parallel Computing, 8th International Workshop, LCPC, pp. 304–317, (1996).

Chang, P–Y. et al., "Improving Branch Prediction Accuracy by Reducing Pattern History Table Interference," Proc. 1996 Conference on Parallel Architectures and Compilation Techniques (PACT '96) Boston, MA, pp. 48–57, (Oct. 20–23, 1996).

* cited by examiner

DYNAMICALLY DISABLING SPECULATIVE PREFETCH WHEN HIGH PRIORITY DEMAND FETCH OPPORTUNITY USE IS HIGH

BACKGROUND OF THE INVENTION

Modern microprocessors comprise many resources such as registers and memory for which various requesters contend. For example, a typical microprocessor has various layers of memory including local instruction and data caches, lower level backup caches (B-cache), main memory, storage devices such as disk drives, and storage available over a network. Generally, these layers form a hierarchical set of memories where at one extreme, the local caches are very fast but tend to be small, whereas at the other extreme, main memory, disk storage, and network storage tend to have very large capacities, but access times are also magnitudes larger than for local memory.

To reduce the impact of the long latency between processor and main memory or other long latency storage, hardware prefetching techniques are utilized. The CPU predicts which memory blocks it will utilize next and requests those blocks from the memory hierarchy before they are actually needed.

Because it cannot be predicted with certainty which branch a branch instruction in the instruction stream will take, these prefetched instructions are said to be speculative. Unfortunately, these prefetches can consume bandwidth to the lower level caches, main memory, etc., reducing the amount of available bandwidth for memory transactions that are needed as soon as possible, for example, for demand misses and cache-victim processing.

SUMMARY OF THE INVENTION

The present invention addresses this problem by providing a mechanism which dynamically detects when a high percentage of memory-access bandwidth is needed for high-priority operations such as demand misses, and which, based on this detection, shuts down low priority requesters such as hardware prefetchers until the demand for the bandwidth is reduced.

A preferred embodiment of the present invention realizes this mechanism by counting the number of high-priority utilizations from the last N opportunities in which the high-priority utilizations could have been requested. When the count exceeds some threshold, indicating high usage by the high-priority requester, a portion of low-priority requests are throttled or disabled. Priority may be determined, for example, by measuring the degree of speculative use of the resource. Thus, speculative prefetches have a lower priority than demand accesses.

In other words, the present invention works on the principle that if bandwidth utilization due to high-priority accesses has been high in the recent past, then it will continue to be high due to high-priority accesses in the near future. To that end, the present invention prohibits hardware prefetchers, which have a lower priority, from making requests during high bandwidth utilization periods to increase overall performance.

Accordingly, a method for arbitrating among a plurality of requesters of resources in a computer system comprises selecting a first requester based on a history of program execution. Other requesters which compete with the first requester are inhibited.

Preferably, the history is based on past utilization of the resources. Preferably, memory, including but not limited to main memory and cache memory, and associated data paths, are resources from which a demand fetcher and a speculative prefetcher request instructions or data. The demand fetcher is the first requester, while the speculative prefetcher is a competing requester.

In a preferred embodiment of the present invention, low-priority utilization of a resource in a digital processor, such as speculative prefetching, is limited in favor of high-priority utilization of the resource such as demand fetching, by determining a value which is predictive of high-priority utilization of the resource. If the predictive value is greater than some threshold, low-priority utilization of the resource is inhibited, or throttled. If the predictive value is less than or equal to the threshold, low-priority utilization of the resource is allowed. Preferably, the threshold is a predefined constant.

Furthermore, the predictive value is preferably determined by counting the number of opportunities in which the resource could have been utilized for a high-priority need, regardless of whether it actually was so utilized. The number of actual high-priority utilizations of the resource is also counted, and divided by the opportunity count, yielding the predictive value.

In a preferred embodiment, some actual high-priority utilizations are given more weight than others. Preferably, recent high-priority utilizations are weighted more heavily than less recent high-priority utilizations.

In another preferred embodiment, the number m of actual high-priority uses from the last N use opportunities is first determined, where N is predefined. The value m is compared with some threshold. Speculative accesses are inhibited if m is greater than a threshold, but are allowed otherwise.

In a preferred embodiment, m is determined by providing an N-bit shift register. A 1 is shifted into the N-bit shift register for each high-priority use opportunity in which there has been an actual high-priority use. A 0 is shifted into the shift register for all other use opportunities, such that a count of 1s in the shift register provides a value for m. Optionally, hysteresis can be used about the threshold.

In a further preferred embodiment, a second shift register is provided. When a 0 is shifted in to the N-bit shift register and 1 is shifted out, the second register is shifted left, with a 0 being shifted in from the right. When a 1 is shifted in to the N-bit register and 0 is shifted out, the second register is shifted right, with a 1 being shifted in from the left. When a certain predesignated bit in the second shift register, associated with the threshold has a value of 1, m is deemed to exceed the threshold.

Similarly, where a plurality of options is available, the techniques of the present invention may be employed by associating a priority level with each option. A value is determined based on past behavior of at least one of the options. At least one high-priority option is selected if the determined value exceeds a threshold such that lower priority options are effectively inhibited. On the other hand, any option may be selected if the determined value does not exceed the threshold.

Finally, where multiple threads are executing, the techniques of the present invention may be employed to select a thread based on utilization of bandwidth, or based on a prioritization among the threads.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
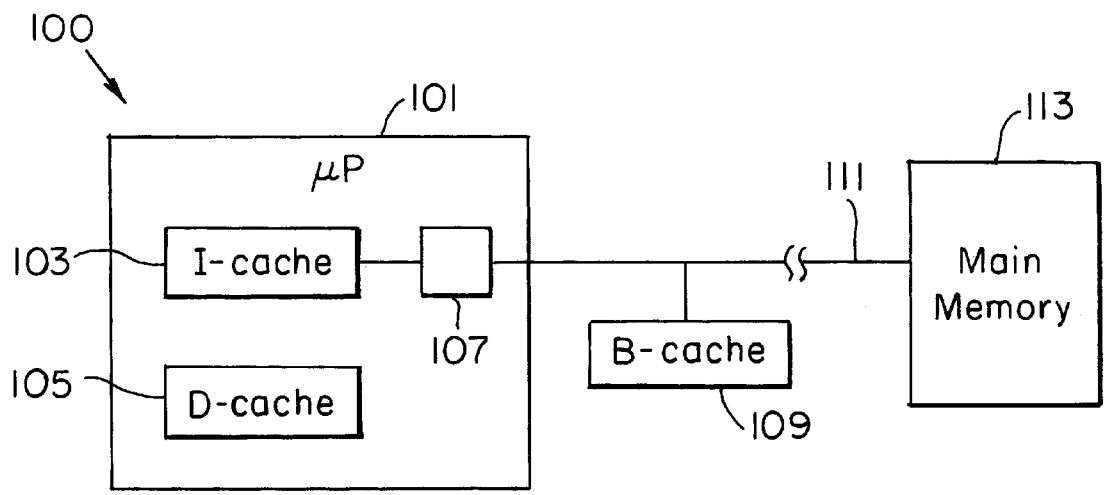
FIG. 1 is a block diagram of a computer system having a main memory and backup cache.

FIG. 1 shows a general computer system 100. A microprocessor (CPU) 101 generally fetches its instructions and data from a main memory 113. However, this main memory and the system bus 111 over which instructions and data travel, tend to slow down the execution of the microprocessor 101 which must wait to receive the instructions or data.

To speed up execution, a modern microprocessor 101 typically has an on-board instruction cache, or I-cache 103, and a data cache, or D-cache 105. Based on the fact that recently-fetched instructions or data tend to be reused, these caches 103, 105 provide the microprocessor 101 with near-instantaneous access to the instructions or data. While the discussion hereafter focuses only on instruction fetching, it will be recognized by those skilled in the art that the discussion applies equally to data fetching.

Memory hierarchies may comprise several caching levels. The first level instruction and data caches described above need to be accessed very quickly. This restriction limits the size of these first-level caches, creating the need for other caches which are larger but are slower to access. Therefore, many computer systems have backup caches, or B-caches 109, which may reside on-chip or off-chip, and which serve as intermediary caches between the first-level caches and main memory 113 or other storage. When needed, instructions or data are retrieved from the first-level caches 103, 105, or from lower levels of the memory hierarchy, as available.

Fetching hardware 108 fetches instructions or data typically as the need arises.

Such fetches are denoted hereafter as "demand requests". In addition, modem CPUs utilize hardware prefetching techniques to reduce the impact of the long latency between the CPU and main memory. The CPU prefetcher 107 predicts which memory blocks the CPU will utilize in the near future and requests those blocks from the memory hierarchy before they are actually needed. The CPU cannot be certain ahead of time which instructions and data it will need in the future. For instruction prefetch, this uncertainty is typically due to branch instructions in the code. This is referred to as "speculative prefetching". Because the results are not needed immediately, timing is less critical with prefetching requests than with demand requests.

Unfortunately, prefetching consumes significant bandwidth to the memory hierarchy, thereby reducing the amount of available bandwidth for memory transactions that are needed as soon as possible, such as for demand misses, cache-victim processing, etc. This can be a problem even when the priority of the prefetch requests has been lowered to below that of other demand misses, because, for example, the prefetch cycle could have already begun. Thus there is a need for a mechanism which dynamically detects when a high percentage of the bandwidth is needed for high-priority accesses such as demand misses, and which shuts down the hardware prefetcher until the demand for bandwidth decreases.

Figure 2:
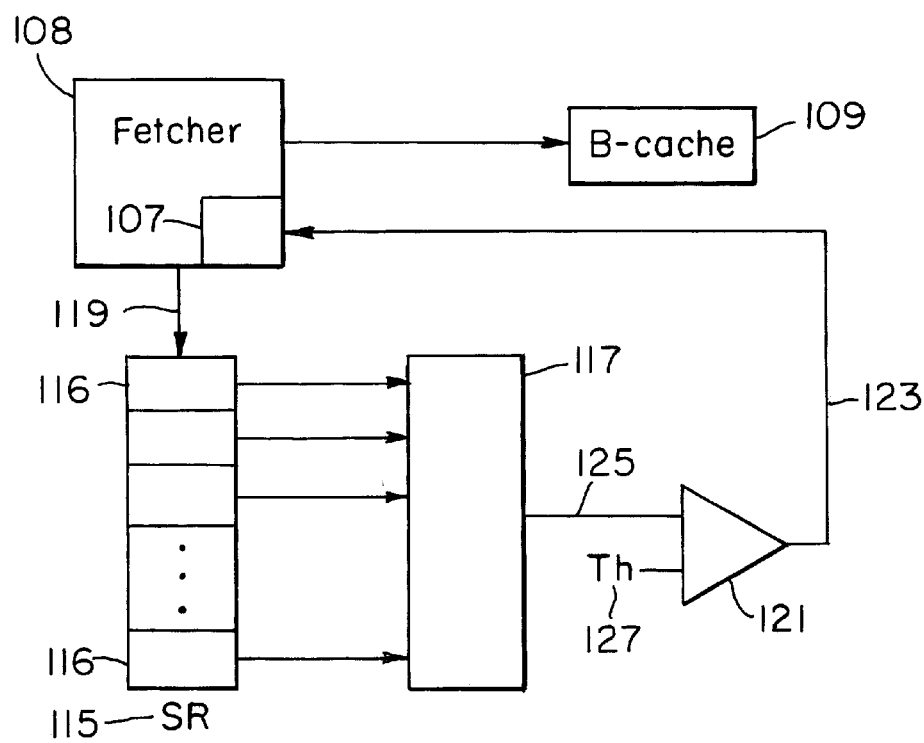
FIG. 2 is a schematic diagram of a preferred embodiment of the present invention using a shift register and counting logic.

FIG. 2 is a schematic diagram of a preferred embodiment of the present invention. Instruction fetching hardware 108 is responsible for fetching instructions from memory, e.g., the B-cache 109. Within the fetching hardware 108 is the hardware prefetcher 107 which is responsible for speculative prefetching. Of course, there could be multiple hardware prefetchers, for example, for instructions and for data.

The present invention works on the principle that if bandwidth utilization for high-priority requests has been high in the recent past, then it will continue to be high in the near future. When recent bandwidth utilization has been high for high-priority requests, speculative requests from the hardware prefetcher 107 are prohibited from making requests.

Information about the recent history of memory bandwidth utilization of a resource, such as a B-cache 109, is captured using a shift register 115 of arbitrary length N. Each bit 116 in the shift register 115 represents one usage opportunity for the memory resource. The fetcher 108 outputs a signal 119 which is indictive of resource usage. For example, if a high-priority demand request was made in the last opportunity, the fetcher 108 shifts a 1 into the register 115 via signal 119. Otherwise, the fetcher 108 shifts a 0 into the register 115. If the register 115 contains N bits, then it holds information about the last N usage opportunities. When the register 115 is full, the oldest information is shifted out of the register 115 as new information is shifted in. To avoid unnecessarily inhibiting the prefetcher 107, low-priority utilizations such as prefetches are preferably not recorded in the shift register 115 as consuming a usage opportunity.

In the present invention, prefetch requests are inhibited depending on some function based upon the contents of the shift register 115. Preferably, this function is a count of the bits 116 in the shift register 115 that are set to 1. This is represented schematically in FIG. 2 by counting logic 117 whose output 125 represents the number of 1s in the shift register 115. This count 125 is compared by comparator 121 to some threshold 127, and if the count 125 exceeds the threshold 127, the comparator 121 generates a choke signal 123 which inhibits the prefetcher 107. Otherwise prefetching is not inhibited.

Figure 3:
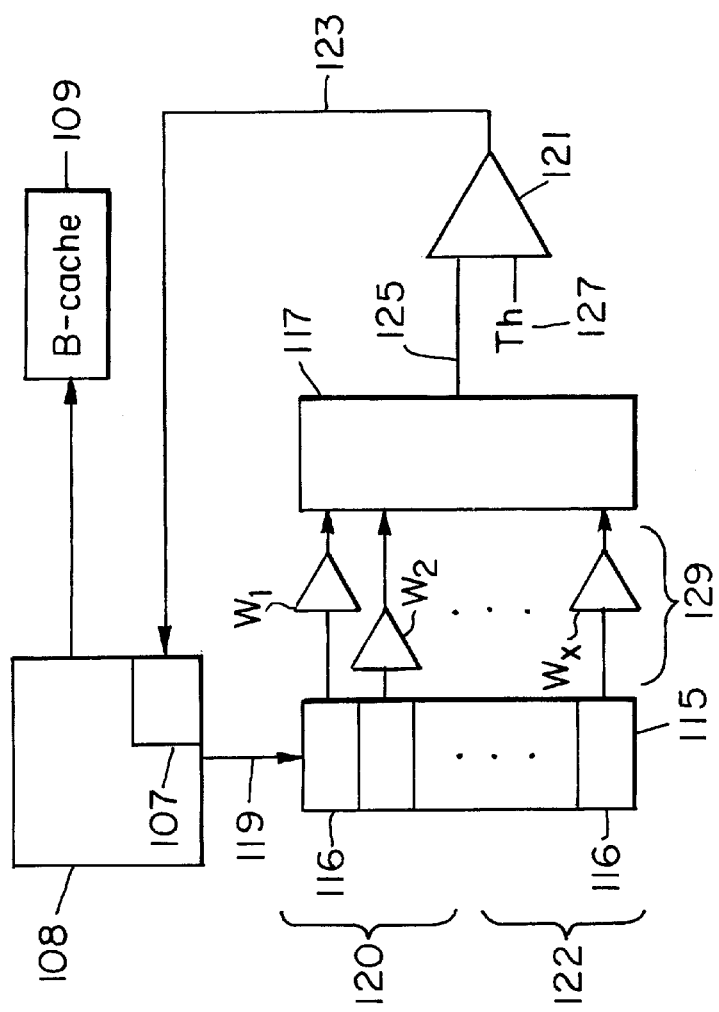
FIG. 3 is a schematic diagram of the embodiment of FIG. 2 with weights added.

FIG. 3 is a schematic diagram of the embodiment similar to that of FIG. 2 in which the bits 116 of the shift register 115 are individually assigned weights 129. Thus, the counting logic 117 in FIG. 3 may give more weight to some bits 116 than others, for example, counting some bits 116 more than once. Preferably, more weight is given to more recent bits 120 in the register 115 than to the older bits 122. The ultimate output of counter logic 117 and operation of the remaining parts is the same as in FIG. 2 as previously discussed.

Figure 4:
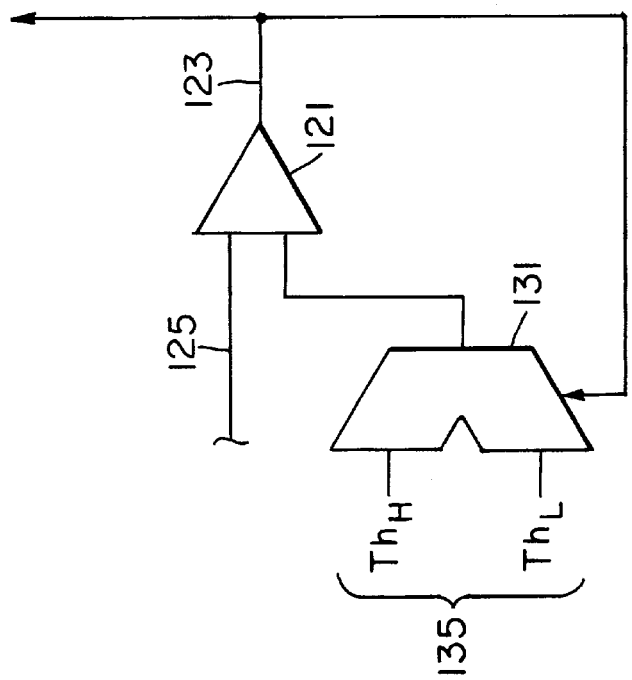
FIG. 4 is a schematic diagram depicting the use of an upper and lower threshold to characterize a variation of the embodiments of the FIGS. 2 and 3 with hysteresis.

FIG. 4 is a schematic diagram depicting the use of two thresholds 135—an upper threshold $Th_H$ and a lower threshold $Th_L$—to characterize a preferred embodiment of the present invention with hysteresis around a nominal threshold. The illustrated thresholds $Th_L$ and $Th_H$ are used instead of threshold 127 Th in FIGS. 2 and 3. Selector 131 selects the upper threshold $Th_H$ when the comparator output 123 indicates that the usage has been low and that prefetching is allowed, and selects the lower threshold $Th_L$ when the comparator output 123 indicates that the usage has been high and prefetching has been turned off.

Figure 5A:
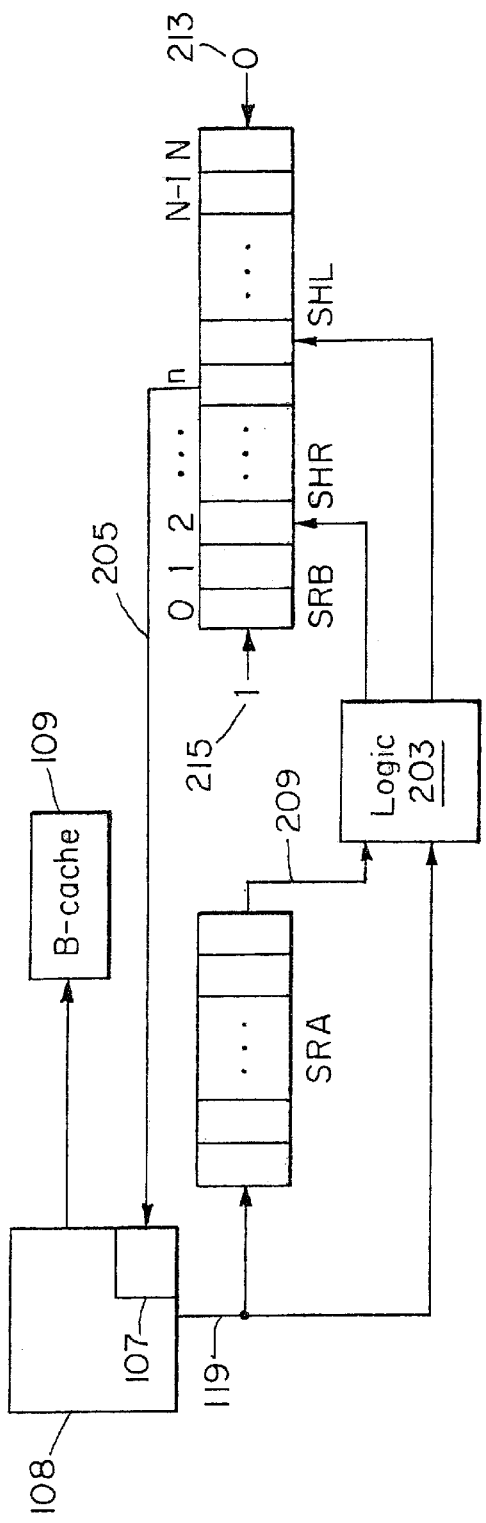
FIG. 5A is a schematic diagram of a preferred embodiment with two shift registers.

FIG. 5A is a schematic diagram of a preferred embodiment using two shift registers, SRA and SRB. Assume that logic in the fetching hardware 108 produces either a 0 or 1 to be shifted into shift register SRA, according to whether the resource was actually used at the last usage opportunity. As before, SRA can be of arbitrary lenth N.

The shift register SRA's input bit 201 and output bit 209 are brought to logic circuit 203. The logic circuit 203 has the following truth table:

| SRA input 201 | SRA output 209 | SHL | SRL | Comment |
|---|---|---|---|---|
| 0 | 0 | 0 | 0 | No change - no action |
| 0 | 1 | 1 | 0 | a 1 has been dropped |
| 1 | 0 | 0 | 1 | a 1 has been added |
| 1 | 1 | 0 | 0 | No change - no action |

The SHL and SHR output signals from the logic circuit 203 command the second shift register SRB to shift left or right respectively. When shift register SRB is shifted to the left via the SHL signal, a 0 is shifted in from the right 213. On the other hand, when register SRB is shifted to the right via the SHR signal, a 1 is shifted in from the left 215. Thus, both registers hold the same number of 1s and 0s, but while register SRA's bits are ordered historically, register SRB groups all of the 1s contiguously to the left side 215 and groups all of the 0s contiguously to the right side 213. Of course, it is obvious to those skilled in the art that the terms left and right are used to differentiate one from the other, and may just as easily be reversed.

Referring to the above logic truth table, when the input and output bits 201, 209 to shift register SRA are the same, i.e., both 0s or both 1s, there is no change to the total number of 1s in the register, and so no action is taken with respect to shift register SRB. However, when the input 201 is a 0 and the output bit 209 is a 1, shift register SRA is losing a 1. Therefore register SRB is shifted left. Note again that when SRB is shifted left, a 0 is shifted in. Finally, when the input bit 201 is a 1 and the output bit 209 is a 0, shift register SRA is gaining a 1, and register SRB is shifted right, with a 1 shifting in from the left 215.

Now, to see if there are more than n actual uses out of the last N opportunities where n is the value of the threshold, i.e., to see if there are more than n 1s in shift register SRA or equivalently, register SRB, the hardware only needs to look at predesignated bit n of register SRB. Predesignated bit n is the n+1st bit from the left 215 end of register SRB as illustrated in FIG. 5 where the leftmost bit is 0. No counting is required. If the value 205 of register SRB bit n is 1, the threshold has been exceeded. In turn, prefetcher 107 is inhibited. Otherwise, when the value 205 of bit n is 0, the threshold is not met and prefetcher 107 remains active.

Figure 5B:
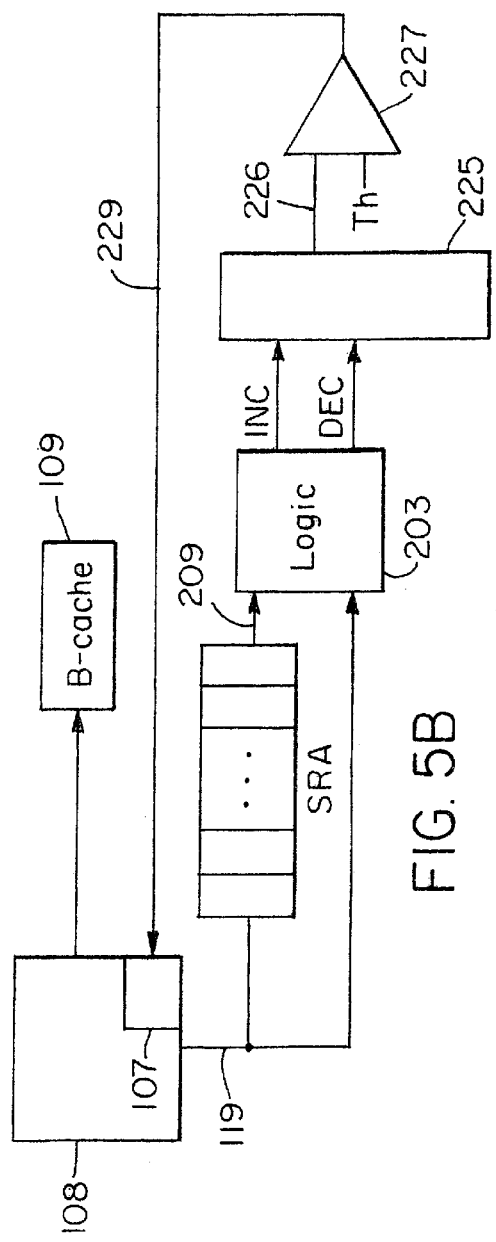
FIG. 5B is a schematic diagram of a preferred embodiment of the present invention using a counter.

FIG. 5B shows an alternate embodiment of the present invention in which a counter 225 and comparator 227 perform essentially the same function as the second shift register SRB of FIG. 5A. The same logic circuit 203 is used, however, its output SHL and SHR signals become decrement and increment signals respectively to the counter 225, which keeps a running tally of the number of 1s in register SRA. As with the embodiment of FIG. 2, the counter's value 226 is compared with a threshold at comparator 227, which generates a choke signal 123 to inhibit the prefetcher 107.

It will be obvious to those skilled in the art that the above use of two shift registers with the logic described above can be used to measure bandwidth for other goals as well as throttling prefetching, e.g. performance evaluation with respect to any type of resource usage. The roles of 0s and 1s could similarly be reversed.

In another embodiment of the present invention, a thread is selected based on bandwidth, or prioritization among the threads.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. In a computer systems, a method of dynamically disabling resource accesses, comprising:
   determining a number m of actual high-priority uses from N last high-priority use opportunities, N being a predefined number, the step of determining m comprising providing an N-bit shift register the N-bit shift register being a first shift register;
   shifting a first value into the N-bit shift register for a high-priority use opportunity in which there has been an actual high-priority use;
   shifting a second value into the N-bit shift register for all other high-priority use opportunities, such that a count of first values in the N-bit shift register provides a value for m;
   comparing m with a threshold;
   inhibiting speculative accesses if m is greater than the threshold; and
   allowing speculative accesses otherwise.

2. The method of claim 1 wherein the threshold is predefined.

3. The method of claim 1, wherein the resource comprises one of main memory, instruction cache memory, or data cache memory.

4. The method of claim 3 wherein high-priority use comprises demand access to memory.

5. The method of claim 4 wherein low-priority use comprises memory prefetching.

6. The method of claim 4 wherein usage of a certain type of resource excludes memory prefetching.

7. The method of claim 1 wherein the threshold is constant.

8. The method of claim 1 wherein the step of determining includes weighting certain high-priority uses relative to other demand uses to calculate m.

9. The method of claim 8 wherein recent high-priority uses are given more weight than older high-priority uses.

10. The method of claim 1 wherein the step of comparing m further comprises:
    providing a second shift register;

upon a second value being shifted in to the N-bit shift register and a first value being shifted out of the N-bit shift register, shifting in a first direction the second shift register, such that a third value is shifted in;

upon a first value being shifted in to the N-bit register and a second value being shifted out of the N-bit shift register, shifting in a second direction the second shift register, such that a fourth value is shifted in; and determining that m exceeds the threshold when a certain bit, in the second shift register, associated with the threshold has a value of the fourth value.

11. The method of claim 1, wherein the step of comparing includes exhibiting properties of hysteresis about the threshold.

12. The method of claim 1 wherein resources are threads of execution, a first thread of execution being assigned a higher priority than a second thread of execution.

13. The method of claim 1, wherein the first value is 1 and the second value is 0.

14. The method of claim 10, wherein the third value is 0 and the fourth value is 1.

15. The method of claim 10, wherein the first direction is to the left and the second direction is to the right.

16. An apparatus for dynamically disabling a hardware prefetcher in a computer system with fetching hardware and memory, comprising:

a shift register, wherein a first value is shifted in for each memory high-priority request opportunity in which a memory demand request is made, and wherein a second value is shifted in for each memory high-priority request opportunity in which no memory high-priority request is made;

counting logic coupled to the shift register for producing a count of first values in the shift register; and a comparator coupled to receiving the count from the counting logic, said comparator comparing the count of first values with a threshold, such that if the count exceeds the threshold, the hardware prefetcher is disabled, and if the count does not exceed the threshold, the hardware prefetcher is not disabled.

17. The apparatus of claim 16 wherein bits in the shift register are weighted and the counting logic counts corresponding weighted values.

18. The apparatus of claim 16 wherein the threshold exhibits hysteresis characteristics.

19. The apparatus of claim 17 wherein high-priority uses are given more weight than older high-priority uses.

20. The apparatus of claim 16 wherein the threshold is constant.

21. The apparatus of claim 16 wherein the threshold is predefined.

22. An apparatus for dynamically disabling a hardware prefetcher in a computer system with fetching hardware and memory, comprising:

a first shift register, wherein a first value is shifted in for each memory high-priority request opportunity in which a memory high-priority request is made, and wherein a second value is shifted in for each memory high-priority request opportunity in which no memory high-priority request is made;

a second shift register, responsive to the first shift register, such that when a first value is shifted into the first shift register and a second value is shifted out of the first shift register, the second shift register is shifted in a first direction with a fourth value shifting in, and when a second value is shifted into the first shift register and a first value is shifted out of the first shift register, the second shift register is shifted in a second direction with a third value shifting in, wherein if a value of a predesignated bit in the second shift register is the fourth value, the hardware prefetcher is disabled, and if the value of the bit is the third value, the hardware prefetcher is not disabled.

23. An apparatus for determining resource usage, in a computer system comprising:

a first shift register, wherein a first value is shifted in for each usage of a certain type of resource, and wherein a second value is shifted in for each usage opportunity of the certain type of resource in which no such usage is made;

a second shift register responsive to the first shift register, such that when a first value is shifted into the first shift register and a second value is shifted out of the first shift register, the second shift register is shifted in a first direction with a fourth value shifting in, and when a second value is shifted into the first shift register and a first value is shifted out of the first shift register, the second shift register is shifted in a second direction with a third value shifting in, the second shift register, having a predesignated bit, and the value of the predesignated bit being indicative of recent resource usage.

24. The apparatus of claim 23 wherein resources are threads of execution, a first thread of execution being assigned a higher priority than a second thread of execution.

25. The apparatus of claim 23, wherein a resource comprises one of main memory, instruction cache memory, or data cache memory.

26. The method of claim 25 wherein usage of a certain type of resource includes demand access to memory.

27. In a computer systems, an apparatus for dynamically disabling resource accesses, comprising:

means for determining a number m of actual high-priority uses from N last high-priority use opportunities, N being a predefined number, means for determining m comprising shifting means for shifting in a first value for a high-priority use opportunity in which there has been an actual high-priority use, and for shifting in a second value for all other high-priority use opportunities, counting means for counting first values from the last N shifts to provide a value for m;

means for comparing m with a threshold;

means for inhibiting speculative accesses if m is greater than the threshold; and means for allowing speculative accesses otherwise.

* * * * *